US008517805B1

(12) United States Patent
Ray et al.

(10) Patent No.: US 8,517,805 B1
(45) Date of Patent: Aug. 27, 2013

(54) POULTRY WING SEGMENTING SYSTEM AND METHOD OF USE (71) Applicant: WRH Holdings, LLC d/b/a Cantrell, Gainesville, GA (US)

(72) Inventors: David Bobby Ray, Gainesville, GA (US); Raymond Gene Duncan, Dawsonville, GA (US); Robert Lee Darby, Canton, GA (US); Anthony W. Rice, Clermont, GA (US); Dane T. Woods, Gainesville, GA (US)

(73) Assignee: WRH Holdings, LLC, Gainesville, GA (US)

( * ) Notice: Subject to any disclaimer, the term of this patent is extended or adjusted under 35 U.S.C. 154(b) by 0 days.

(21) Appl. No.: 13/711,963

(22) Filed: Dec. 12, 2012

(51) Int. Cl.
A22C 21/00 (2006.01)
(52) U.S. Cl.
USPC .......................................... 452/169
(58) Field of Classification Search
USPC ................... 452/149, 166, 167, 169, 170
See application file for complete search history.

(56) References Cited

U.S. PATENT DOCUMENTS

| 4,207,653 | A | * | 6/1980 | Gasbarro | 452/169 |
|---|---|---|---|---|---|
| 4,442,741 | A | | 4/1984 | Whittingham et al. | |
| 4,480,353 | A | | 11/1984 | Martin et al. | |
| 4,577,368 | A | | 3/1986 | Hazenbroek | |
| 4,769,872 | A | * | 9/1988 | Hazenbroek et al. | 452/169 |
| 5,078,644 | A | * | 1/1992 | DiGerlando | 452/169 |
| 5,080,631 | A | | 1/1992 | Howard et al. | |
| 5,147,241 | A | * | 9/1992 | Rudin | 452/169 |
| 5,176,564 | A | | 1/1993 | Hazenbroek | |
| 5,188,560 | A | | 2/1993 | Hazenbroek | |
| 5,429,549 | A | | 7/1995 | Verrijp et al. | |
| 5,496,210 | A | * | 3/1996 | Davis | 452/169 |
| 5,613,431 | A | | 3/1997 | Tateno | |
| 6,036,596 | A | | 3/2000 | Lay | |
| 6,929,541 | B2 | | 8/2005 | Cervantes et al. | |
| 7,261,629 | B2 | | 8/2007 | Holleman | |
| 7,341,505 | B1 | * | 3/2008 | Gasbarro | 452/169 |
| 7,374,478 | B2 | * | 5/2008 | Gasbarro | 452/149 |
| 2002/0058470 | A1 | | 5/2002 | Schmidt et al. | |
| 2003/0084856 | A1 | | 5/2003 | Hazenbroek et al. | |
| 2010/0317272 | A1 | | 12/2010 | Hazenbroek et al. | |
| 2011/0237172 | A1 | | 9/2011 | Mcbrayer et al. | |

* cited by examiner

*Primary Examiner* — Richard Price, Jr.
(74) *Attorney, Agent, or Firm* — Mathew L. Grell; Balser & Grell IP Law (57) ABSTRACT

A poultry wing segmenting system and method of use, includes a drive mechanism, a conveyor having a plurality of spaced shackles which hold the poultry wing suspended by their shoulder joints vertically positioned and presented to a horizontally rotatable wheel which has a plurality of circumferentially spaced lateral notched slots therearound, the rotatable wheel has a pair of annular slots into which cutting blades are positioned, a plurality of wing engaging members and guide members to bias and open the wing joints against cutting blades drawn through the annular to produce separate poultry wing segments of drumette, flat, and tip.

20 Claims, 12 Drawing Sheets

POULTRY WING SEGMENTING SYSTEM AND METHOD OF USE

TECHNICAL FIELD

The disclosure generally relates to butchering and more specifically, it is related to subdivision of a poultry wing into three segments.

BACKGROUND

The poultry wings, especially chicken wings, are typically presented as spiced buffalo wings in the form of flats and drums. Such poultry wings or wing segments are eaten by holding the cooked wings or wing segments in the hands and eating the meat away from the bones. In order to segment the poultry wings into flats and drumettes the poultry wing must be portioned into drumette, flat, and tip.

At first, the separation of the wing segments from one another was performed by hand. For example, the poultry wing is removed from the poultry carcass by cutting the poultry carcass at the carcass shoulder joints and then cutting the poultry wings at the elbow joint between the drumette and flat, and at the tip joint between the flat and wing tip sections to produce separate poultry wing segments. Such manual poultry wing processing was expensive and time consuming. However, with the growing consumer demand for segmented poultry wings, it became desirable to automate the processing of poultry wings.

One approach is a poultry wing portioner, which after the whole wing(s) are removed from the carcass they are manually placed in a vertically rotatable wheel which has a plurality of circumferentially spaced lateral troughs therearound, in which the poultry wings are horizontally positioned and presented for being cut into drumette, flats, and tip wing. Specifically, such vertically rotatable wheel has a pair of annular slots or grooves into which cutting blades whether stationary or rotating, are positioned. With the poultry wing received in one of the circumferentially spaced lateral troughs such that the elbow joint and tip joint of such poultry wing align respectively with the two annular slots of such wheel, the poultry wing portionor may be used to draw knife blades through such slots so as to cut apart the poultry wing at the respective joints.

Another approach is a poultry wing cutting apparatus or wing portioner characterized by a rotatably mounted drum-like wing retaining member provided with a plurality of spaced wing receiving grooves extending generally in an axial direction along the outer surface of the retaining member. A plurality of axially spaced slots is provided which intersect the grooves. Knife means are provided which extend into predetermined portions of said slots and cooperative with a plurality of wing engaging members which are disposed in other preselected slots to bias said wing downwardly against each of said knife means to selectively sever the wing at desired locations. Such wing portioner may operate efficiently at 50-60 wings per minute; however, this speed is dependent on the operator's ability to load wings into the portioner.

Another approach includes a loop conveyor of poultry wing shackles and a circular saw or a conveyor that holds the carcass in an inverted attitude suspended by their legs from shackles as their torsos move between a pair of guide rods and guide rails specifically for guiding the pair of elbow joints through the disc cutters. The portioner is configured to enable a user to place poultry wings in the shackles, which are conveyed past a circular saw. The circular saw cuts the poultry wings into drumette, flats, and tip wing.

Another approach includes poultry wings suspended by their tip segments and oriented so that their outside surfaces face one side of the processing path, with right wings oriented with their elbows leading, and left wings oriented with their elbows trailing. The elbow joints are bent by a bending guide, opening the elbow joints. The open joints are cut and separated into drumettes and flats.

The problems associated with such poultry wing apparatus include the requirement to load left wing and right wing differently, the accuracy of the joint cuts is dependent on the individual sizes of the drumette, flat, and tip and also dependent upon whether the poultry wing is a right hand wing or a left hand wing. If the poultry wing(s) are incorrectly cut such cuts will produce wing segments that contain shattered or fragmented bone segments, exposed open bone areas, and/or bone marrow contamination resulting in degraded and less valuable wing segments.

Therefore, it is readily apparent that there is a recognizable unmet need for a poultry wing segmenting system and method of use that is not dependent on left wing and right wing orientation, and which can produce consistent high speed joint cuts without producing shattered or fragmented bone segments, exposed open bone areas, and/or bone marrow contamination.

SUMMARY

Briefly described, in an example embodiment, the present apparatus and method overcomes the above-mentioned disadvantages and meets the recognized need for a poultry wing segmenting system and method of use, in general, a drive mechanism, a conveyor having a plurality of spaced shackles which hold the poultry wing suspended by their shoulder joints vertically positioned and presented to a horizontally rotatable wheel which has a plurality of circumferentially spaced lateral notched slots therearound, to receive the vertical hung poultry wing, the rotatable wheel has a pair of annular slots or grooves into which cutting blades are positioned, a plurality of wing engaging members and guide members which are disposed in other preselected positions to bias and open the wing joints against cutting blades drawn through the annular slots to selectively sever the wing at the elbow joint between the drumette and flat, and at the tip joint between the flat and wing tip to produce separate poultry wing segments of drumette, flat, and tip and discharge them into individual receptacles and, thus, functions to produce consistent high speed joint cuts without producing shattered or fragmented bone segments, exposed open bone areas, and/or bone marrow contamination.

According to its major aspects and broadly stated, the present apparatus meets the recognized need for a poultry wing segmenting system to segment the poultry wing into segments, a drumette having a shoulder joint, a flat having an elbow joint and a tip joint, and a tip, said system includes a drive mechanism, a conveyor having a plurality of spaced shackles configured to vertically hold the poultry wing suspended by its shoulder joint, a segmented wheel configured with a plurality of contoured troughs circumferentially disposed laterally therearound said segmented wheel, said wheel configured to receive the vertical hung poultry wing from said shackles, and wherein said segmented wheel is configured with one or more annular slots wherein at least one cutting blade is positioned, and wherein said segmented wheel is further configured with a pivotable wing tip cup, at least one guide bar disposed adjacent said segmented wheel to bias the at least one segment of the poultry wing against said contoured trough of said segmented wheel and to draw said cutting blade through said annular slots to sever the poultry wing into one or more segments.

Accordingly, a feature of the poultry wing segmenting system and method of use is its ability to reduce the bottle neck of having a single operator feed individual poultry wings into a vertical wing wheel of a wing portionor, and thus, expand to multiple operators feeding individual poultry wings into shackles along a shackle line.

Another feature of the poultry wing segmenting system and method of use is its ability to reduce the number of motors required to operate a poultry wing portioner.

Yet another feature of the poultry wing segmenting system and method of use is its ability to reduce energy consumption of the wing portioner station and reduce the overall energy demand of the poultry processing line.

Yet another feature of the poultry wing segmenting system and method of use is its ability to improve the overall efficiency of a poultry processing line and the efficient operation of the wing portioner station or processing phase.

Yet another feature of the poultry wing segmenting system and method of use is its ability to efficiently and consistently provide Grade A high speed joint cuts without producing shattered or fragmented bone segments, exposed open bone areas, and/or bone marrow contamination.

Yet another feature of the poultry wing segmenting system and method of use is its ability to provide a more safe work environment for machine operators by eliminating rotating blades as a cutting means.

Yet another feature of the poultry wing segmenting system and method of use is its ability to hang the poultry wing in the shackle by gripping the shoulder joint or drumette rather than hanging the poultry wing by the wing tip, which can slip from the shackle.

Yet another feature of the poultry wing segmenting system and method of use is its ability to remove or transfer the poultry wing from its shackle to a wheel or rotary drum prior to cutting the poultry wing into itssegments.

Yet another feature of the poultry wing segmenting system and method of use is its ability to provide a wheel or rotary drum having cutouts with adjacent pivoting cams to facilitate transfer of the poultry wing from its shackle to a wheel or rotary drum prior to cutting the poultry wing into its segments.

Yet another feature of the poultry wing segmenting system and method of use is its ability to provide a pivotable cam for each rotary drum cutout to drop or unload the poultry wing tip into its receptacle rather than prior arts use of gravity.

Yet another feature of the poultry wing segmenting system and method of use is its ability to provide guide bars which hold the poultry wing segments until dropped into their respective receptacles rather than holding the poultry wing only while it's being cut.

Yet another feature of the poultry wing segmenting system and method of use is its ability to provide guide bars which guide and hold the poultry wing segments (tip, mid, and drum sections) until dropped into their respective receptacles.

Yet another feature of the poultry wing segmenting system and method of use is its ability to provide a spring loaded finger to unload the tip into its receptacle.

Yet another feature of the poultry wing segmenting system and method of use is its ability to provide slide plates which hold the poultry wing flat segment until slid and dropped into its receptacle.

Yet another feature of the poultry wing segmenting system and method of use is its ability to provide a separation arc, which holds the poultry wing drumette segment until dropped into its receptacle.

Yet another feature of the poultry wing segmenting system and method of use is its ability to provide a separation arc, which holds the poultry wing drumette segment until dropped into its receptacle.

Yet another feature of the poultry wing segmenting system and method of use is its ability to hold the drumette using a drumette guide rod on the outside of the drumette and a drumette guide plate on the inside of the drumette.

Yet another feature of the poultry wing segmenting system and method of use is its ability to drop segmented poultry wing segments in sequence of tip, flat, and drumette into individual receptacle.

Yet another feature of the poultry wing segmenting system and method of use is its ability to provide a pivotable blade to enable easy cleaning and maintenance and repair or replacement.

Yet another feature of the poultry wing segmenting system and method of use is its ability to provide a poultry wing shackle system rather than a single operator feed wheel enabling faster processing times and multiple workers may load poultry wings along a moving shackle system.

Yet another feature of the poultry wing segmenting system and method of use is its ability to provide a new stationary blade design and configuration.

These and other features of the poultry wing segmenting system and method of use will become more apparent to one skilled in the art from the following Brief Description of the Drawings, Detailed Drawings, Detailed Description and Claims when read in light of the accompanying drawings.

BRIEF DESCRIPTION OF THE DRAWINGS

The present retractable display system and method of use or the like will be better understood by reading the Detailed Description of the embodiments with reference to the accompanying drawings, in which like reference to numerals denote similar structures and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-12 specific terminology is employed for the sake of clarity. The present disclosure; however, is not intended to be limited to the specific terminology so selected, and it is to be understood that each specific element includes all technical equivalents that operate in a similar manner to accomplish similar functions. Embodiments of the claims may; however, be embodied in many different forms and should not be construed to be limited to the embodiments set forth herein. The examples set forth herein are non-limiting examples, and are merely examples among other possible examples.

Figure 1:
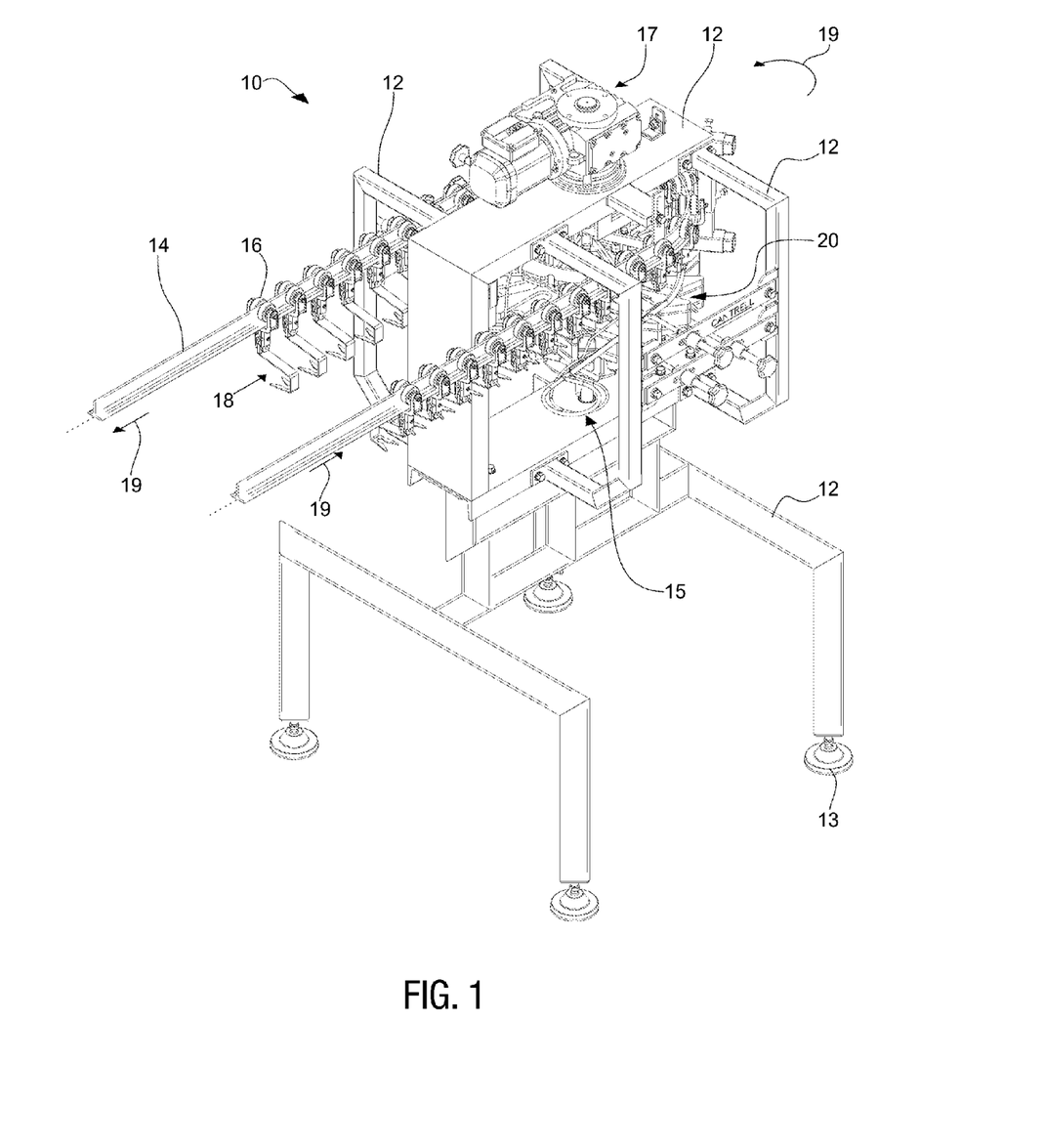
FIG. 1 is a perspective view of an exemplary poultry wing segmenter.

Referring now to FIG. 1 by way of example, and not limitation, there is illustrated an example embodiment exemplary poultry wing portioner or poultry wing segmenting system 10. Preferably, poultry wing segmenter 10 includes support structure, such as frame 12 configured to form the framework or support for poultry wing segmenter 10. Preferably, adjustable or leveling casters or foot pads 13 are preferably removeably affixed to frame 12 (likely on its underside) and provide contact support to a surface area, such as the plant floor and enable adjustment to level poultry wing segmenter 10. Frame 12 may be configured as solid or hollow member(s) having tubular, angled, sheet, or rectangular beam cross-section or the like to permit frame 12 to support poultry wing segmenter 10. Furthermore, poultry wing segmenter 10 preferably includes rotary guide or track, such as shackle rail 14, and a plurality of shackle assemblies 18 having wheels, such as rollers 16 to enable rotational travel and connection of shackle assembly 18 along and to shackle rail 14, spaced at intervals and travel as indicated by direction arrows 19. Preferably, shackle assemblies 18 are oriented to hold the poultry wing shoulder joint SJ and hold the poultry wing PW in a vertical orientation adjacent shackle rail 14. Still further, poultry wing segmenter 10 preferably includes rotational power source 17 which may further include motor, shaft, gear box or differential gear or drive gear, or toothed sprocket or belt or chain (not shown) to impart rotary movement of shackle assembly 18 about shackle rail 14 as indicated by direction arrows 19. Still yet further, poultry wing segmenter 10 preferably includes wing wheel 20 rotationally driven by power source 17 as indicated by arc direction arrows 19 and guide rods or guide bars 15 disposed along the perimeter of wing wheel 20, which guide poultry wing PW thereabout wing wheel 20.

It is recognized that poultry wing segmenter 10 may be configured with a single power source 17, thus reducing the number of motors required to operate poultry wing segmenter 10.

It is further recognized that poultry wing segmenter 10 configured with a single power source 17 preferably reduces energy consumption of the wing portioner station and reduces the overall energy consumption of the poultry processing line as a whole.

Frame 12, shackle assembly 18, shackle rail 14, and foot pads 13 are preferably formed, molded or configured from a suitable material, such as stainless steel, aluminum, sheet metal, plastic, or alternative resin, fiber, reinforced fiber, or other suitable rigid support material or the like and any manufacturing method, capable of providing structure to frame 12, shackle assembly 18, shackle rail 14, and foot pads 13. Preferably, the material includes other suitable characteristics, such as strength, rigidity, durability, water-resistance, light weight, smooth surface, impact resistant surface, cleanability, sterilization, chemical inertness, oxidation resistance, safety, longevity, or other beneficial characteristic understood by one skilled in the art.

Figure 2:
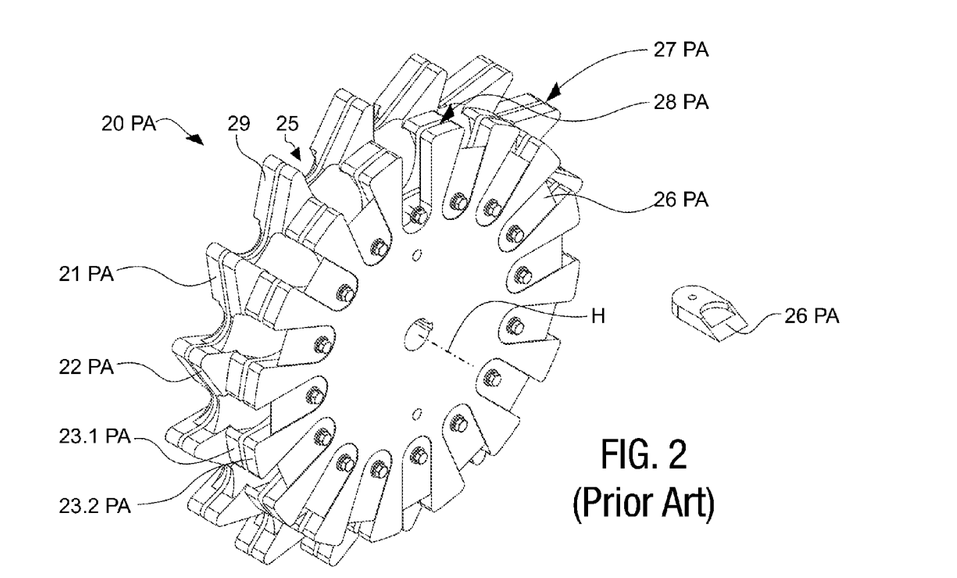
FIG. 2 is a perspective side view of a prior art wing wheel.

Referring now to FIG. 2 by way of example, and not limitation, there is illustrated a prior art wing wheel 20PA. Wing wheel 20PA includes a multi-piece wing wheel assembly formed of wheel segments, such as first wheel segment 21PA where the poultry wing drumette is positioned (not shown), second wheel segment 22PA where the poultry wing flat is positioned (not shown), third wheel segment 23.1PA where the poultry wing tip is positioned (not shown), and fourth wheel segment 23.2PA assembled about a common horizontal drive axis H. Positioned between multi-piece wing wheel segments are one or more knife blades (not shown), such as between first wheel segment 21PA and second wheel segment 22PA is first annular slot 27PA for receipt of an annular cutting blade (not shown) and between third wheel segment 23.1PA and fourth wheel segment 23.2PA is second annular slot 28PA for receipt of an annular cutting blade (not shown). Additionally, a plurality of teeth elements 29PA of predetermined shape are formed about the periphery of each of the respective wheel segments. Such wheel segments are collectively rotated about a common horizontal drive axis H in fixed relative alignment such that the teeth elements 29PA form a plurality of circumferentially spaced lateral troughs 25PA for receiving poultry wings therein to be cut apart by annular cutting blade (not shown) disposed in first annular slot 27PA and second annular slot 28PA. Moreover, wing wheel 20PA includes cup 26PA to hold the poultry wing tip in place to prevent it from dislodging horizontally from wing wheel 20PA.

Figure 3:
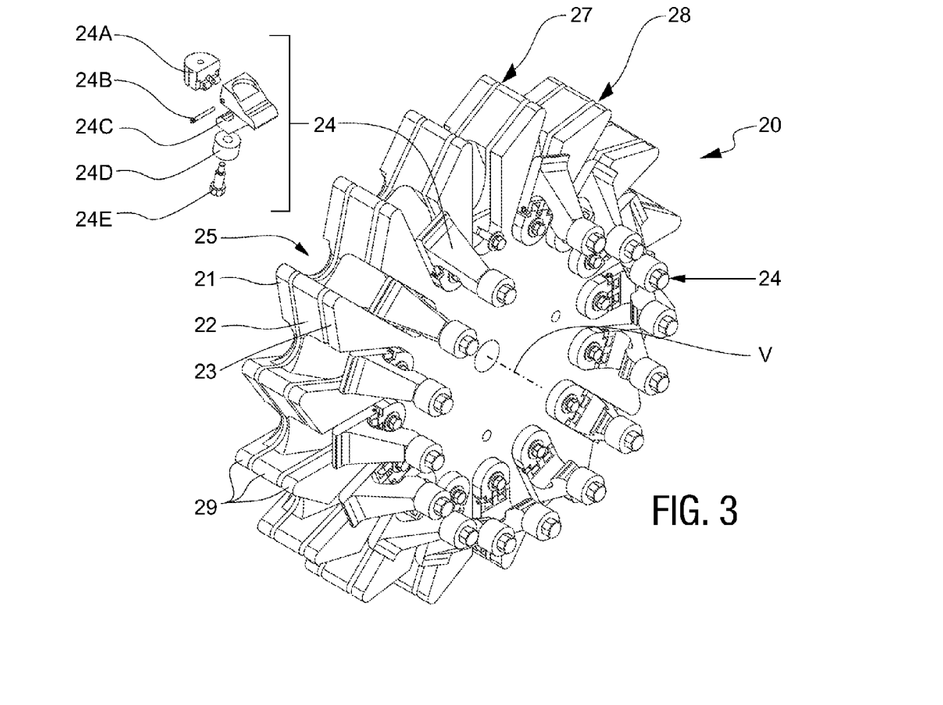
FIG. 3 is a perspective bottom view of an exemplary wing wheel of FIG. 1.

Referring now to FIG. 3 by way of example, and not limitation, there is illustrated an example embodiment exemplary wing wheel 20. Preferably, wing wheel 20 includes a multi-piece wing wheel assembly formed of wheel segments, such as first wheel segment 21 configured and positioned to receive and/or support the poultry wing drumette (not shown), second wheel segment 22 configured and positioned to receive and/or support the poultry wing flat (not shown), and third wheel segment 23 configured and positioned to receive and/or support the poultry wing tip (not shown), and such wheel segments are assembled about common vertical drive axis V. Positioned between multi-piece wing wheel segments preferably are one or more knife blades (not shown) and one or more annular slots, such as between first wheel segment 21 and second wheel segment 22 therein is preferably first annular slot 27 for receipt of first annular cutting blade (not shown) and between second wheel segment 22 and third wheel segment 23 is preferably second annular slot 28 for receipt of second annular cutting blade (not shown). Additionally, a plurality of teeth elements 29 of predetermined shape are formed about the periphery of each of respective wheel segments, first wheel segment 21, second wheel segment 22, and third wheel segment 23. Such wheel segments are collectively rotated about a common vertical drive axis V in fixed relative alignment such that teeth elements 29 form a plurality of circumferentially spaced lateral troughs 25 for receiving poultry wings therein to be cut into poultry wing segments of drumette, flat, and tip by first and second annular cutting blades (not shown) disposed in first annular slot and second annular slot 28. It is contemplated herein that troughs 25 may be configured as contoured, concave, convex, combinations and the like. Moreover, wing wheel 20 preferably includes wing tip cup module 24, which is preferably pivotable by contacting and following a cam (not shown) to enable proper loading and positioning of poultry wing tip (not shown) within troughs 25 of wing wheel 20 and to prevent poultry wing tip (not shown) from an untimely dislodging horizontally from troughs 25 of wing wheel 20. Furthermore, wing tip cup module 24 includes mounting base 24A, pivot member 24C, pin 24B to removably affix mounting base 24A thereto pivot member 24C and to preferably enable hinged or pivot movement therebetween, wheel or roller 24D is preferably releasably affixed to the underside of pivot member 24C by attachment device 24E where roller 24D preferably rides cam 41 (shown in FIG. 4) to an open position to timely unload or discharge poultry wing tip (shown in FIG. 4).

Figure 4:
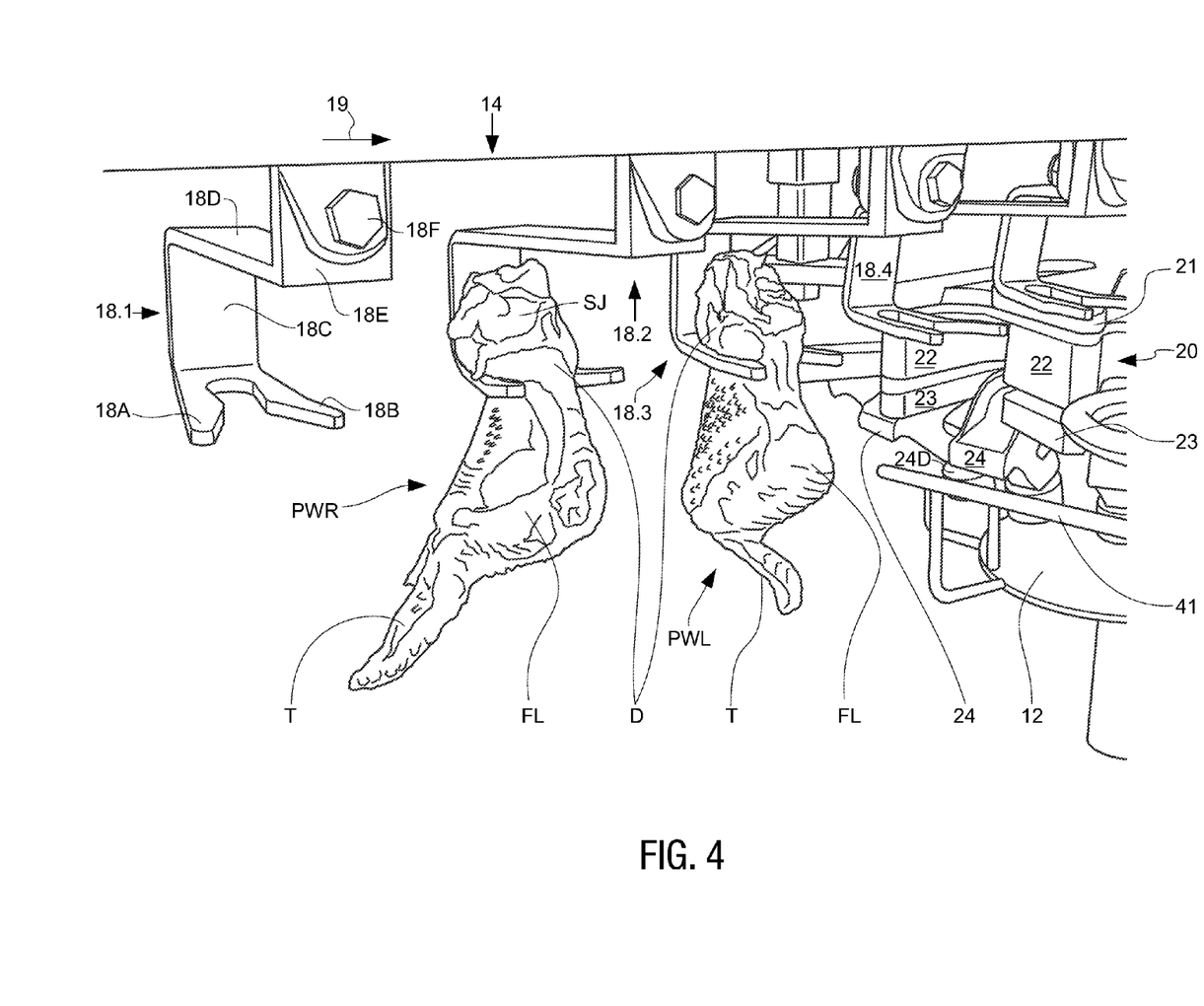
FIG. 4 is a partial perspective side view of the exemplary poultry wing segmenter of FIG. 1, showing one or more exemplary shackle assemblies traversing an exemplary shackle rail for loading poultry wings therein wing wheel.

Referring now to FIG. 4 by way of example, and not limitation, there is illustrated a partial perspective side view of poultry wing segmenter 10 showing one or more exemplary shackle assemblies 18 traversing an exemplary shackle rail 14 for loading left or right poultry wings therein to wing wheel 20. Preferably, poultry wing segmenter 10 includes one or more shackle assemblies 18 moving in series along shackle rail 14 via a trolley chain (not shown), as indicated by direction arrows 19. Each shackle assembly 18, such as shackle assembly 18.1, preferably includes one or more support segments and one or more transition points, such as first support segment 18E oriented in an upright attitude and releasably connected on its upper end to roller 16 (shown in FIG. 1) via attachment device 18F. Furthermore, first support segment 18E is preferably connected and/or transitioned to second support segment 18D oriented in a horizontal attitude and further connected or transitioned to third support segment 18C oriented in an upright attitude, which is preferably connected or transitioned to lower end of shackle 18, such as fourth support segment 18B and fifth support segment 18A, which form a bifurcated, u-shaped, and/or v-shaped poultry wing shoulder carrier.

It is recognized herein that poultry wing segmenter 10 may accommodate left poultry wings PWL and/or right poultry wings PWR, as shown in FIG. 4.

It is further recognized herein that poultry wing segmenter 10 reduces the bottle neck of having a single operator feed individual poultry wings into a vertical wing wheel of a wing portioner, and thus, expands operation to multiple operators feeding individual poultry wings PW into shackles 18 along a shackle line or shackle rail 14.

It is further recognized herein that shackles 18 of poultry wing segmenter 10 are preferably configured to hang poultry wing PW in shackle 18 by bifurcated fourth support segment 18B and fifth support segment 18A gripping shoulder joint SJ or drumette D rather than hanging the poultry wing PW upside down by hanging from wing tip T, which can slip from the shackle 18.

Figure 5:
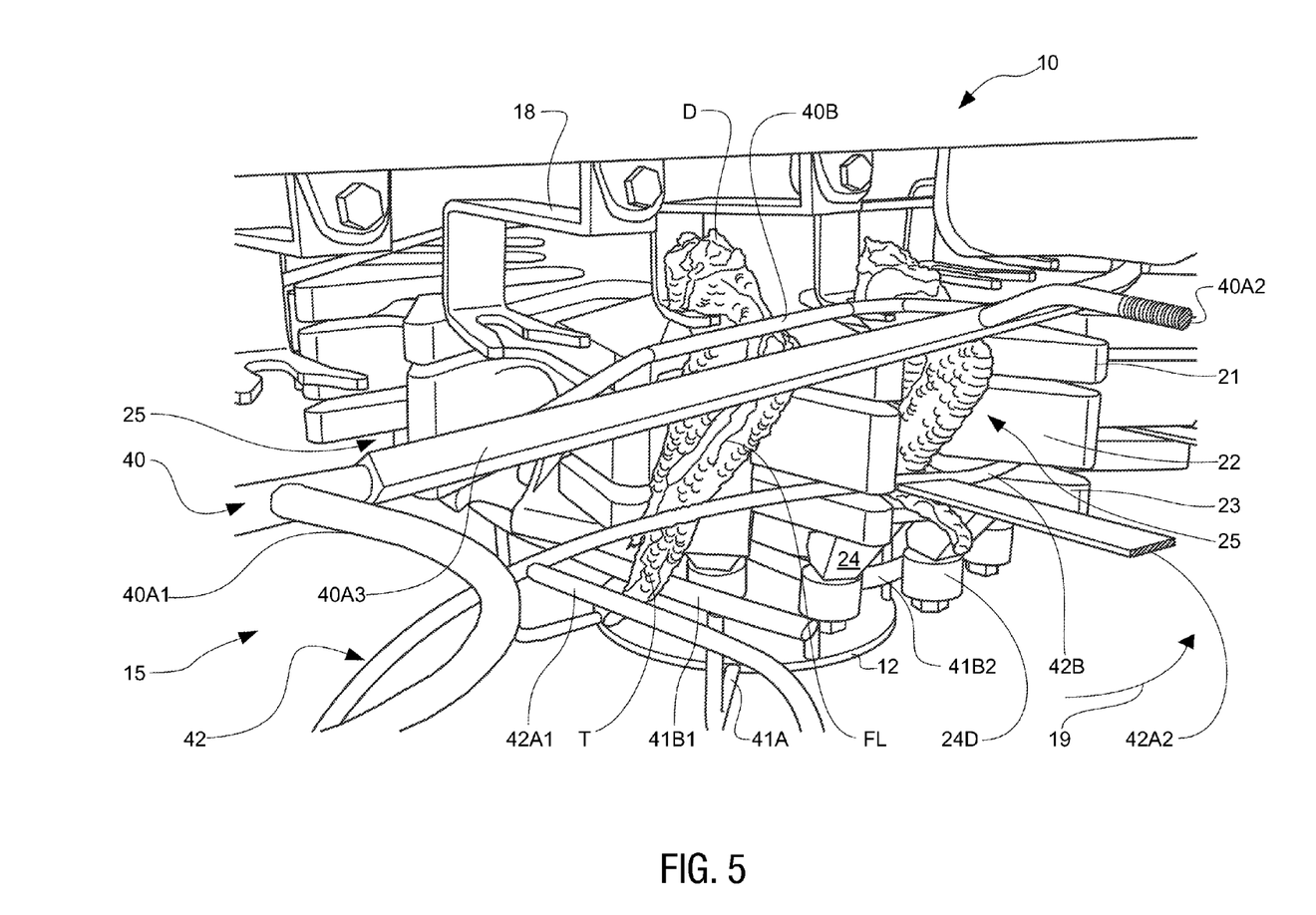
FIG. 5 is a partial perspective side view of the exemplary poultry wing segmenter of FIG. 1, showing one or more exemplary guide bars to assist shackle assemblies with positioning or loading poultry wings therein troughs of wing wheel.

Referring now to FIG. 5 by way of example, and not limitation, there is illustrated a partial perspective side view of poultry wing segmenter 10 showing one or more exemplary guide bars 15 preferably configured to assist shackle assemblies 18 with delivery, positioning, holding, loading and/or unloading of poultry wings PW in troughs 25 of wing wheel 20. Preferably, poultry wing segmenter 10 includes one or more guide bars 15, such as drumette guide bar 40 and tip guide bar 42. Moreover, drumette guide bar 40 includes one or more drumette support bars 40A, such as drumette support bar 40A1, drumette support bar 40A2, and drumette support bar 40A3 configured to provide support and position therefrom frame 12 (shown in FIG. 1) and delivery, positioning, holding, loading and/or unloading of drumette D. Preferably, drumette support bars 40A position and support drumette guide bar 40B from frame 12 (shown in FIG. 1). Furthermore, tip guide bar 42 includes one or more tip support bars 42A, such as tip support bar 42A1 and tip support bar 42A2 configured to provide support and position therefrom frame 12 (shown in FIG. 1) and delivery, positioning, holding, loading and/or unloading of tip joint TJ, flat FL, and tip T. Preferably, tip support bars 42A positions and supports tip leading guide bar 42B from frame 12 (shown in FIG. 1).

It is recognized herein that drumette guide bar 40B and tip leading guide bar 42B are configured as stationary curved rods that extend in the poultry wings PW processing path adjacent the perimeter of wing wheel 20, as indicated by direction arrows 19 until poultry wings PW begin to move in an arcuate path about wing wheel 20. This preferably assures that poultry wings PW will be properly positioned within troughs 25 of wing wheel 20, such as drumette D is positioned in first wheel segment 21 of troughs 25, flat FL is positioned in second wheel segment 22 of troughs 25, and tip T is positioned in third wheel segment 23 of troughs 25 as poultry wings PW are being frictionally engaged by drumette guide bar 40B and tip guide bar 42B. It is recognized herein that this sequence properly orients either left poultry wings PWL and/or right poultry wings PWR within troughs 25 of wing wheel 20 for subsequent processes.

In use, as shackle assemblies 18 preferably traverses around wing wheel 20, as indicated by direction arrows 19, drumette D of poultry wings PW preferably contacts drumette guide bar 40B. Drumette guide bar 40B is preferably configured to urge, push, hold, and/or force drumette D into first wheel segment 21 of troughs 25 of wing wheel 20 of poultry wing segmenter 10 without operator assistance. As poultry wings PW continues its sequence shackle assemblies 18 continues on an inner path relative to of wing wheel 20 outer path, wherein drumette guide bar 40B transfers or releases drumette D of poultry wings PW to first wheel segment 21 of troughs 25 of wing wheel 20 as poultry wings PW traverses wing wheel 20 of poultry wing segmenter 10.

Moreover, as shackle assemblies 18 preferably traverses around wing wheel 20, as indicated by direction arrows 19, tip T of poultry wings PW preferably contacts tip guide bar 42B. Tip guide bar 42B is preferably configured to urge, push, hold, and/or force tip T and/or flat FL into third wheel segment 23 and second wheel segment 22, respectively, of troughs 25 of wing wheel 20 of poultry wing segmenter 10 without operator assistance. As poultry wings PW continues its sequence tip guide bar 42B preferably urges or pushes tip T of poultry wings PW into third wheel segment 23 of troughs 25 of wing wheel 20 as roller 24D of wing tip cup module 24 contacts and pivots about cam 41B, such wing tip cup module 24 is preferably configured to fold tip T of poultry wings PW and hold tip T of poultry wings PW as poultry wings PW traverses wing wheel 20 of poultry wing segmenter 10.

It is recognized herein that the configuration set forth in this FIG. 5, more specifically first wheel segment 21, second wheel segment 22, third wheel segment 23 of troughs 25 of wing wheel 20, drumette guide bar 40B, tip guide bar 42B, wing tip module 24, and roller 24D of wing tip cup module 24 contacts and pivots about cam 41B, such configuration enable different sized poultry wings PW to be accommodated by poultry wing segmenter 10.

Figure 5A:
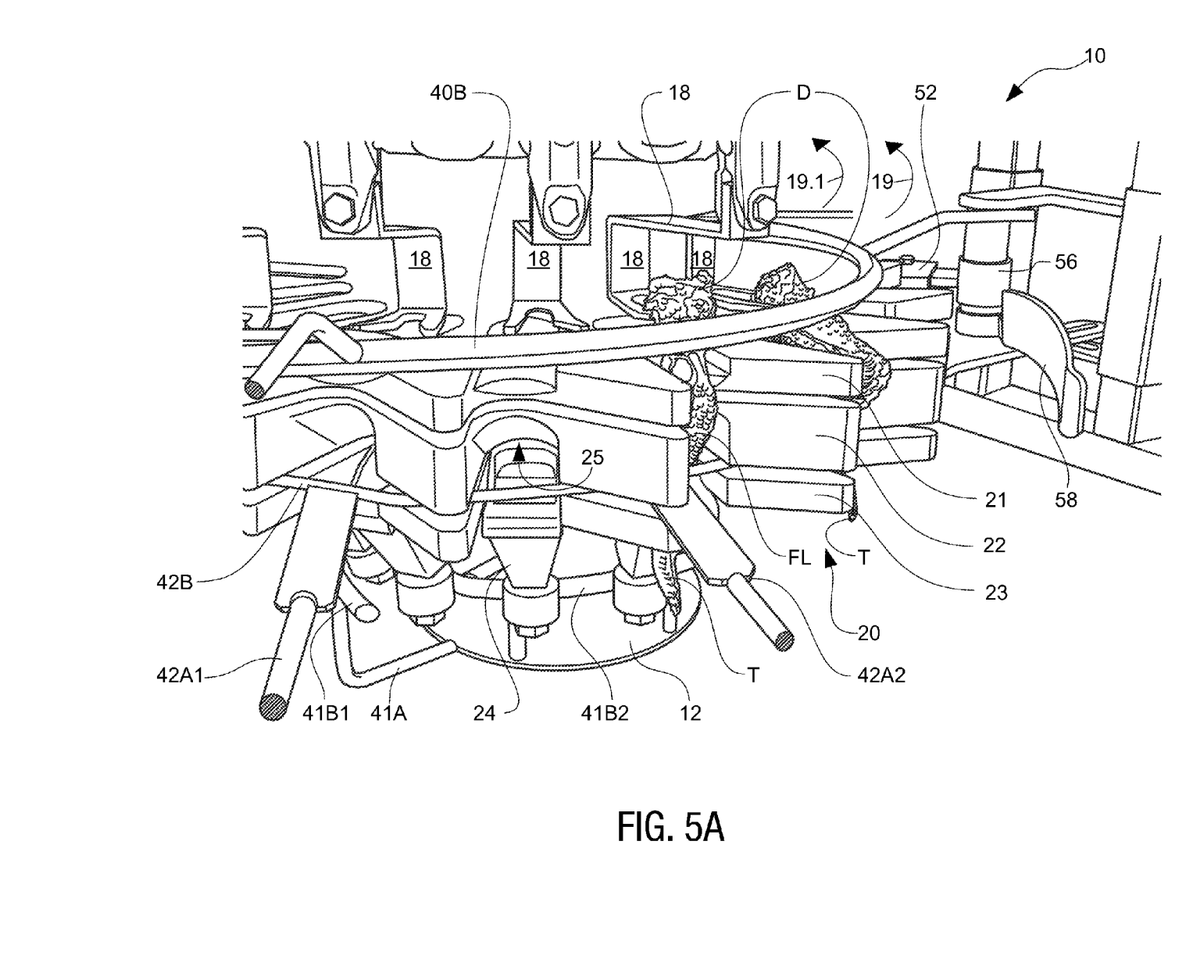
FIG. 5A is a partial perspective side view of the poultry wing segmenter of FIG. 1, showing one or more exemplary guide bars to assist shackle assemblies with release and/or transfer of poultry wings therein troughs of wing wheel.

Referring now to FIG. 5A by way of example, and not limitation, there is illustrated a partial perspective side view of poultry wing segmenter 10 showing one or more exemplary guide bars 15 preferably configured to assist shackle assemblies 18 with release and transfer of poultry wings PW into troughs 25 of wing wheel 20. Preferably, shackle assemblies 18 preferably traverses around an inner circle or path relative to wing wheel 20, as indicated by inner direction arrows 19.1 while wing wheel 20 traverses around an outer circle or path relative to shackle assemblies 18, as indicated by outer direction arrows 19, whereby wing wheel 20 pulls and shackle assemblies 18 releases poultry wings PW into troughs 25 of wing wheel 20, and poultry wings PW is preferably held therein by guide bars 15, such as drumette guide bar 40B (and tip guide bar 42B), which transfers or releases drumette D of poultry wings PW to first wheel segment 21 of troughs 25 of wing wheel 20 in preparation for portioning.

It is recognized herein that poultry wing segmenter 10 is preferably configured to remove or transfer poultry wings PW from shackle assemblies 18 to wing wheel 20 prior to cutting poultry wings PW into is segments.

It is recognized herein that poultry wing segmenter 10 is preferably configured to provide wing wheel 20 to have troughs 25 with adjacent pivoting wing tip cup module 24 activated or operated by cam 41B to facilitate transfer of poultry wings PW from shackle assemblies 18 to wing wheel 20 prior to cutting poultry wings PW into its segments.

Figure 6:
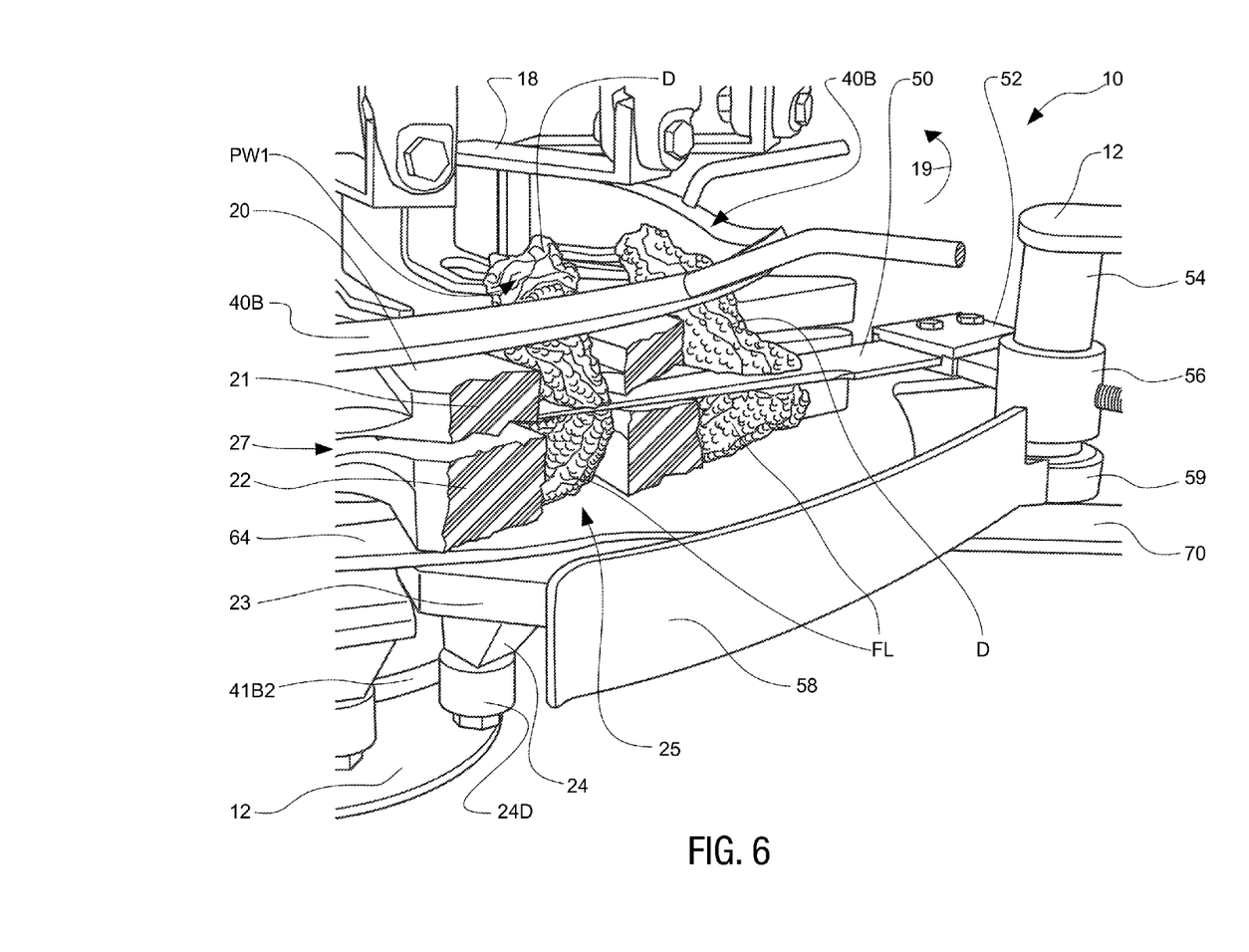
FIG. 6 is a partial cutaway perspective side view of poultry wing segmenter of FIG. 1, showing first blade positioned therein first annular slot.

Referring now to FIG. 6 by way of example, and not limitation, there is illustrated a partial cutaway perspective side view of poultry wing segmenter 10 showing one or more stationary knives or blades, such as first blade 50. Preferably, first blade 50 includes releasable holder 52, an adjustment device, such as collar adjuster 56, shaft 54 affixed to frame 12, and blade attachment device 59 and blade guard 58. As illustrated in FIG. 6, further rotation or movement of poultry wings PW about wing wheel 20, as indicated by direction arrows 19, causes poultry wings PW to come in contact with first blade 50 cutting the poultry wing PW at the mid or elbow joint positioned between the drumette D and flat FL while the poultry wings PW are bent about the mid or elbow joint positioned between the drumette D and flat FL by preferably drumette guide bar 40B.

It is recognized herein that first poultry wings PW, as shown in FIG. 6, further movement of first poultry wings PW about wing wheel 20 causes further outward bending of first poultry wings PW at the mid or elbow joint positioned between the drumette D and flat FL to provide Grade A high speed elbow joint cuts between drumette D and flat FL without producing shattered or fragmented bone segments, exposed open bone areas, and/or bone marrow and contaminations thereof.

It is recognized herein that the configuration set forth in FIG. 6, more specifically first wheel segment 21, second wheel segment 22, are preferably contoured or convex configuration of troughs 25 of wing wheel 20, drumette guide bar 40B, such configuration enables cutting by first blade 50 of poultry wing PW at the mid or elbow joint positioned between drumette D and flat FL while the poultry wings PW are bent about contoured or convex configuration of troughs 25. Contoured or convex configuration of troughs of poultry wing segmenter 10 preferably separates the elbow joint between the drumette D and flat FL to provide Grade A high speed elbow joint cuts between drumette D and flat FL without producing shattered or fragmented bone segments, exposed open bone areas, and/or bone marrow and contaminations thereof.

It is recognized herein that the configuration set forth in this FIG. 6, more specifically wing wheel 20, in which the poultry wings PW are vertically positioned and presented for being cut into drumette D, and flats FL, at this stage of the sequence. Specifically, such horizontally rotatable wing wheel 20 has one or more annular slots or grooves, such as first annular slot 27 into which first blade 50 is preferably positioned. With poultry wing PW received in one of contoured troughs 25 of wing wheel 20 such that the elbow joint of such poultry wing PW aligns respectively with first annular slot 27 of wing wheel 20, poultry wing segmenter 10 is preferably configured to draw first blade 50 through such first annular slot 27 so as to cut apart poultry wing PW at the respective elbow joint between drumette D and flat FL.

Figure 7:
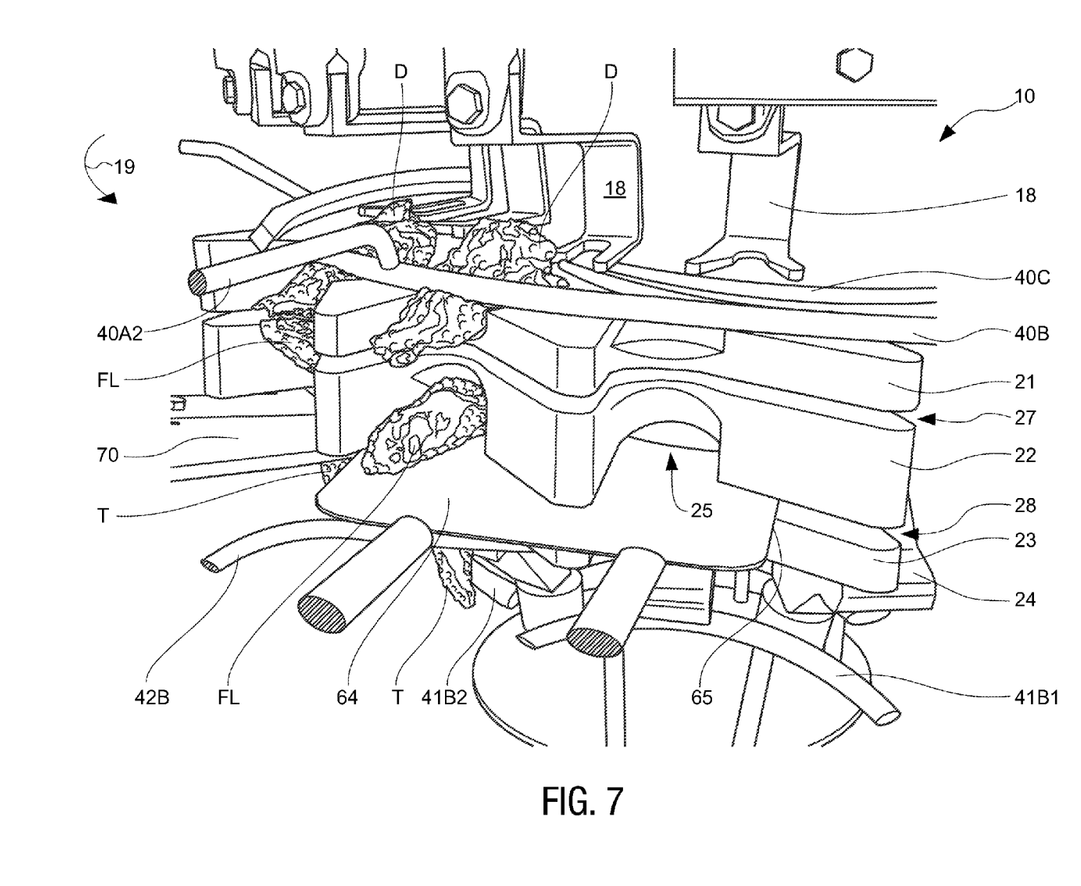
FIG. 7 is a partial cutaway perspective side view of poultry wing segmenter of FIG. 1, showing poultry wings released from shackle assemblies into troughs of the wing wheel.

Referring now to FIG. 7 by way of example, and not limitation, there is illustrated a partial cutaway perspective side view of poultry wing segmenter 10 showing poultry wings PW released from shackle assemblies 18 into troughs 25 of wing wheel 20, and poultry wings PW is preferably held therein by guide bars 15, such as drumette guide bar 40B (and drumette exit guide bar 40C), which transfers or releases drumette D of poultry wings PW to first wheel segment 21 of troughs 25 of wing wheel 20 in preparation for portioning. Preferably, at this sequence, poultry wings PW is preferably separated or portioned at the elbow joint between the drumette D and flat FL by first blade 50 and flat FL is preferably deposited or discharged onto a horizontal surface, such as slide plate 64 positioned therein at least one of annular slots or grooves, such as second annular slot 28. Flat FL is preferably further rotated by wing wheel 20, as indicated by direction arrows 19, and second wheel segment 22 of troughs 25 of wing wheel 20 and slide plate 64 are preferably configured to carry or hold flat FL, as indicated by direction arrows 19, until flat FL reaches slide plate edge 65 where flat FL is preferably discharged into a bin, shoot, or receptacle (shown in FIG. 11) for collecting flat FL.

Figure 8:
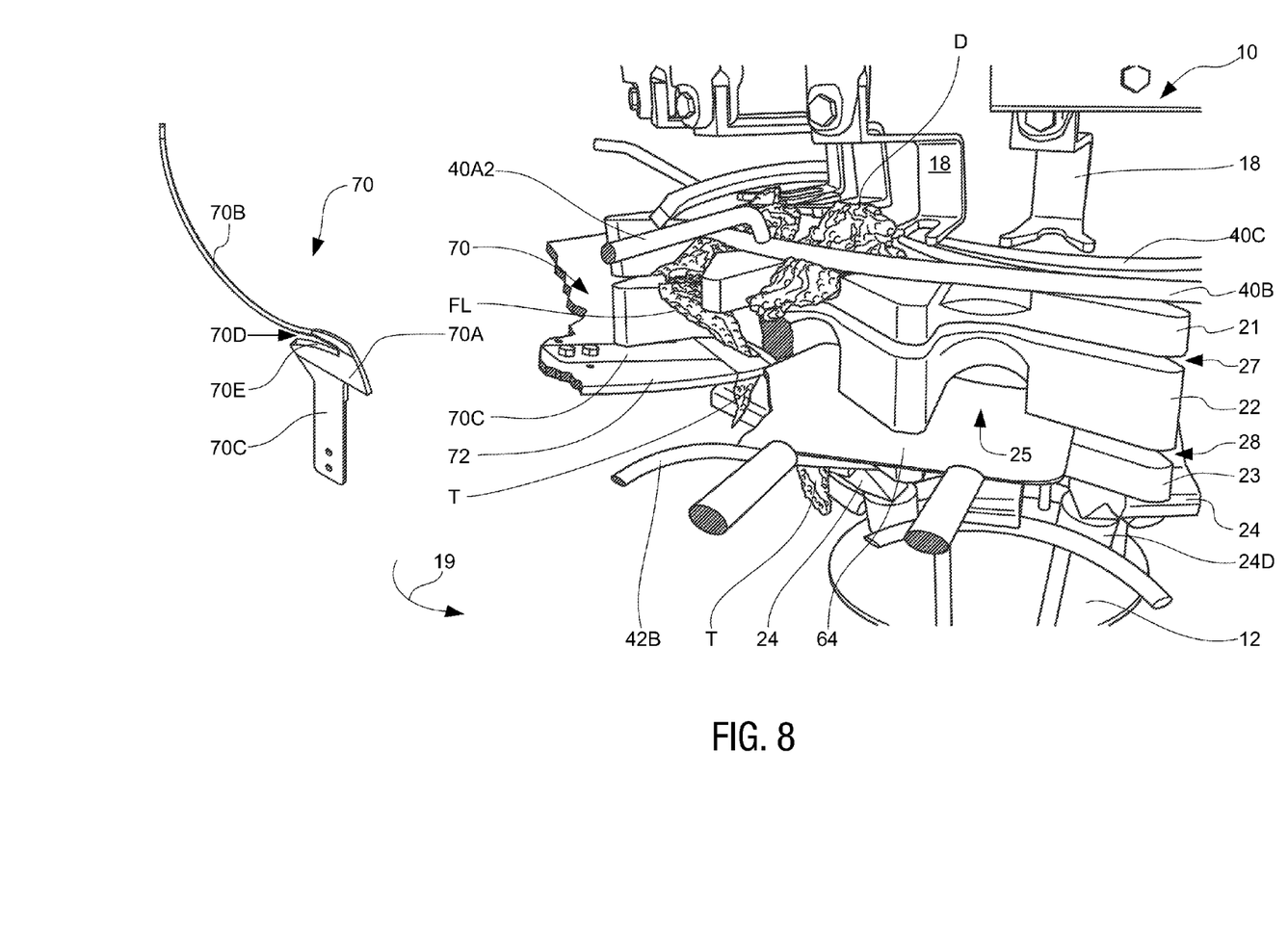
FIG. 8 is a partial cutaway perspective side view of poultry wing segmenter of FIG. 1, showing second blade positioned therein first annular slot.

Referring now to FIG. 8 by way of example, and not limitation, there is illustrated a partial cutaway perspective side view of poultry wing segmenter 10 showing one or more stationary knives or blades, such as second blade 70. Preferably, poultry wing segmenter 10 includes second blade 70 similarly affixed to frame 12 as first blade 50 and includes releasable holder 72 and blade handle 70C. Second blade 70 preferably includes bifurcated blade 70A, beveled edge 70E, guide wire 70B, blade handle 70C, and blade opening 70C.

As illustrated in FIG. 8, further rotation or movement of poultry wings PW about wing wheel 20, as indicated by direction arrows 19, causes poultry wings PW to traverse guide wire 70B, and aligned contact with bifurcated blade 70A of second blade 70 cutting the poultry wing PW at the lower or wrist joint positioned between the flat FL and tip T while the poultry wings PW are bent about the lower or wrist joint positioned between the flat FL and tip T preferably by tip guide bar 42B (as shown in FIGS. 5 and 7).

It is recognized herein that first poultry wings PW, as shown in FIG. 8, further movement of first poultry wings PW about wing wheel 20 causes beveled edge 70E to separate the lower or wrist joint positioned between the flat FL and tip T to provide Grade A high speed lower or wrist joint cuts between the flat FL and tip T without producing shattered or fragmented bone segments, exposed open bone areas, and/or bone marrow and contaminations thereof.

It is recognized herein that first poultry wings PW, as shown in FIG. 8, further movement of first poultry wings PW about wing wheel 20 causes further outward bending of first poultry wings PW at the lower or wrist joint positioned between the flat FL and tip T to provide Grade A high speed lower or wrist joint cuts between the flat FL and tip T without producing shattered or fragmented bone segments, exposed open bone areas, and/or bone marrow and contaminations thereof.

It is recognized herein that the configuration set forth in FIG. 8, more specifically second wheel segment 22, third wheel segment 23, are preferably contoured or convex configuration of troughs 25 of wing wheel 20, tip guide bar 42B, wing tip cup module 24, and/or roller 24D of wing tip cup module 24, such configuration enables cutting by second blade 70 of poultry wing PW at the lower or wrist joint positioned between the flat FL and tip T while the poultry wings PW are bent about contoured or convex configuration of troughs 25. Contoured or convex configuration of troughs of poultry wing segmenter 10 preferably separates the lower or wrist joint positioned between the flat FL and tip T to provide Grade A high speed elbow joint cuts between flat FL and tip T without producing shattered or fragmented bone segments, exposed open bone areas, and/or bone marrow and contaminations thereof.

It is recognized herein that the configuration set forth in this FIG. 8, more specifically wing wheel 20, in which the poultry wings PW are vertically positioned and presented for being cut into flats FL and tip T, at this stage of the sequence. Specifically, such horizontally rotatable wing wheel 20 has one or more annular slots or grooves, such as second annular slot 28 into which second blade 70 is preferably positioned. With poultry wing PW received in one of contoured troughs 25 of wing wheel 20 such that lower or wrist joint positioned between the flat FL and tip T aligns respectively with second annular slot of wing wheel 20, poultry wing segmenter 10 is preferably configured to draw second blade 70 through such second annular slot 28 so as to cut apart poultry wing PW at the respective lower or wrist joint positioned between the flat FL and tip T.

Moreover, as shackle assemblies 18 preferably traverses around wing wheel 20, as indicated by direction arrows 19, poultry wings PW is preferably separated or portioned at the elbow joint between the drumette D and flat FL by first blade 50 and flat FL is preferably deposited or discharged onto a horizontal surface, such as slide plate 64 positioned therein at least one of annular slots or grooves, such as second annular slot 28 and poultry wings PW is preferably separated or portioned at the lower or wrist joint between the flat FL and tip T by second blade 70 and tip T is preferably held by tip guide bar 42B in third wheel segment 23 of troughs 25 of wing wheel 20 as roller 24D of wing tip cup module 24 contacts and pivots about cam 41B, such wing tip cup module 24 is preferably configured to fold tip T of poultry wings PW and hold tip T of poultry wings PW as poultry wings PW traverses wing wheel 20 of poultry wing segmenter 10.

Figure 9:
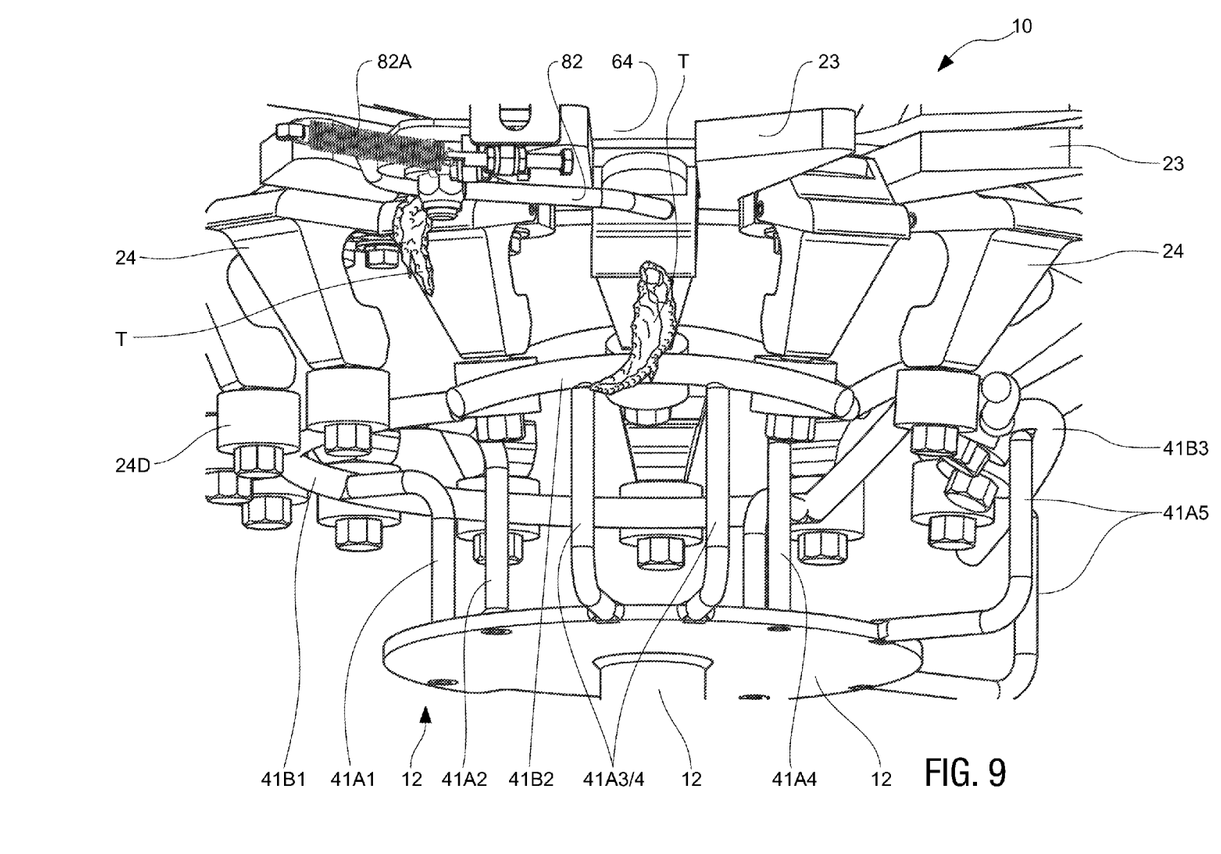
FIG. 9 is a partial cutaway perspective side view of poultry wing segmenter of FIG. 1, showing operation of tip cup module 24 about cam 41B.

Referring now to FIG. 9 by way of example, and not limitation, there is illustrated a partial cutaway perspective side view of poultry wing segmenter 10 showing operation of tip cup module 24 about cam 41B. Preferably cam 41B includes one or more cams, such as cam 41B1, cam 41B2, and cam 41B3 and such cams are positioned and supported by cam supports 41A, (including 41A1, 41A2, 41A3, 41A4, and 41A5) positioned between frame 12 and cams 41B. Preferably, as poultry wings PW continues its sequence roller 24D of wing tip cup module 24 contacts and pivots about cams 41B1, such that wing tip cup module 24 is preferably configured to pivot and fold tip T of poultry wings PW and hold tip T of poultry wings PW. Preferably, as poultry wings PW continues its sequence roller 24D of wing tip cup module 24 contacts and pivots about cams 41B2, such that wing tip cup module 24 bends or pivots to releases tip T of poultry wings PW to preferably discharged tip T into a bin, shoot, or receptacle (shown in FIG. 11) for collecting tip T as poultry wings PW traverses wing wheel 20 of poultry wing segmenter 10.

It is recognized herein that the configuration set forth in FIG. 9, preferably enables wing tip cup module 24 to pivot in and out of poultry wing segmenter 10, and more specifically pivot in and out relative to wing wheel 20 to enable tip T of the poultry wings PW to be loaded and closed to hold tip T of the poultry wings PW in wing wheel 20 for cutting, and opens again after cutting to enable tip T of the poultry wings PW to be discharged into a bin, shoot, or receptacle (shown in FIG. 11) for collecting tip T as poultry wings PW traverses wing wheel 20 of poultry wing segmenter 10. It is further recognized herein that tip T will not release or discharge from of troughs 25 of wing wheel 20 unless wing tip cup module 24 pivots about pin 24B by movement of roller 24D across cam 41B.

Moreover, if the tip T of the poultry wings PW happens to stick to wing tip cup module 24 and tip T is unable to discharge poultry wing segmenter 10, poultry wing segmenter preferably includes rotational unloader bar 82 rotationally affixed to frame 12 and a bias mechanism, such as spring 82A. Preferably unloader bar 82 is disposed or positioned adjacent open tip cup module 24 to contact tip T stuck in wing tip cup module 24 and discharged tip T into a bin, shoot, or receptacle (shown in FIG. 11) for collecting tip T as poultry wings PW traverses wing wheel 20 of poultry wing segmenter 10.

Figure 10:
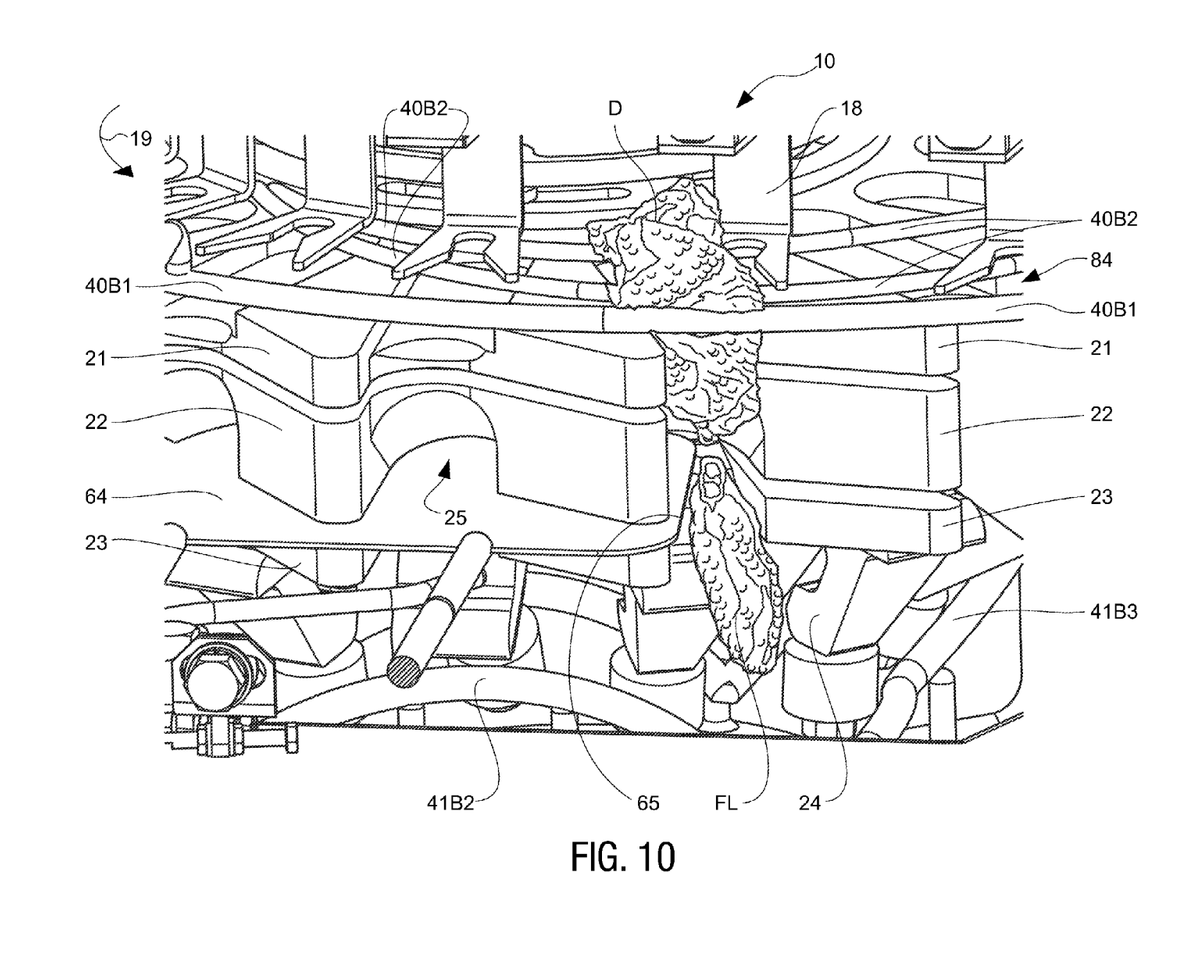
FIG. 10 is a partial cutaway perspective side view of poultry wing segmenter of FIG. 1, showing flat slide plate configured to carry poultry wing flat.

Referring now to FIG. 10 by way of example, and not limitation, there is illustrated a partial cutaway perspective side view of poultry wing segmenter 10 showing slide plate 64 configured to carry flat FL, as indicated by direction arrows 19. Preferably second wheel segment 22 of troughs 25 of wing wheel 20 and slide plate 64 are preferably configured to carry flat FL, as indicated by direction arrows 19, until flat FL reaches slide plate edge 65 where flat FL is preferably discharged or falls into a bin, shoot, or receptacle (shown in FIG. 11) for collecting flat FL.

Moreover, as poultry wings PW traverses around wing wheel 20, as indicated by direction arrows 19, drumette D of poultry wings PW preferably contacts outside drumette guide bar 40B1 and inside drumette guide bar 40B2, both preferably configured to urge and/or pull drumette D from troughs 25 of first wheel segment 21 of wing wheel 20 of poultry wing segmenter 10 preferably discharged drumette D into a bin, shoot, or receptacle (shown in FIG. 11) for collecting flat FL. It is recognized that outside drumette guide bar 40B1 and inside drumette guide bar 40B2 separate from one another to enable wing wheel 20 to discharged drumette D.

Figure 11:
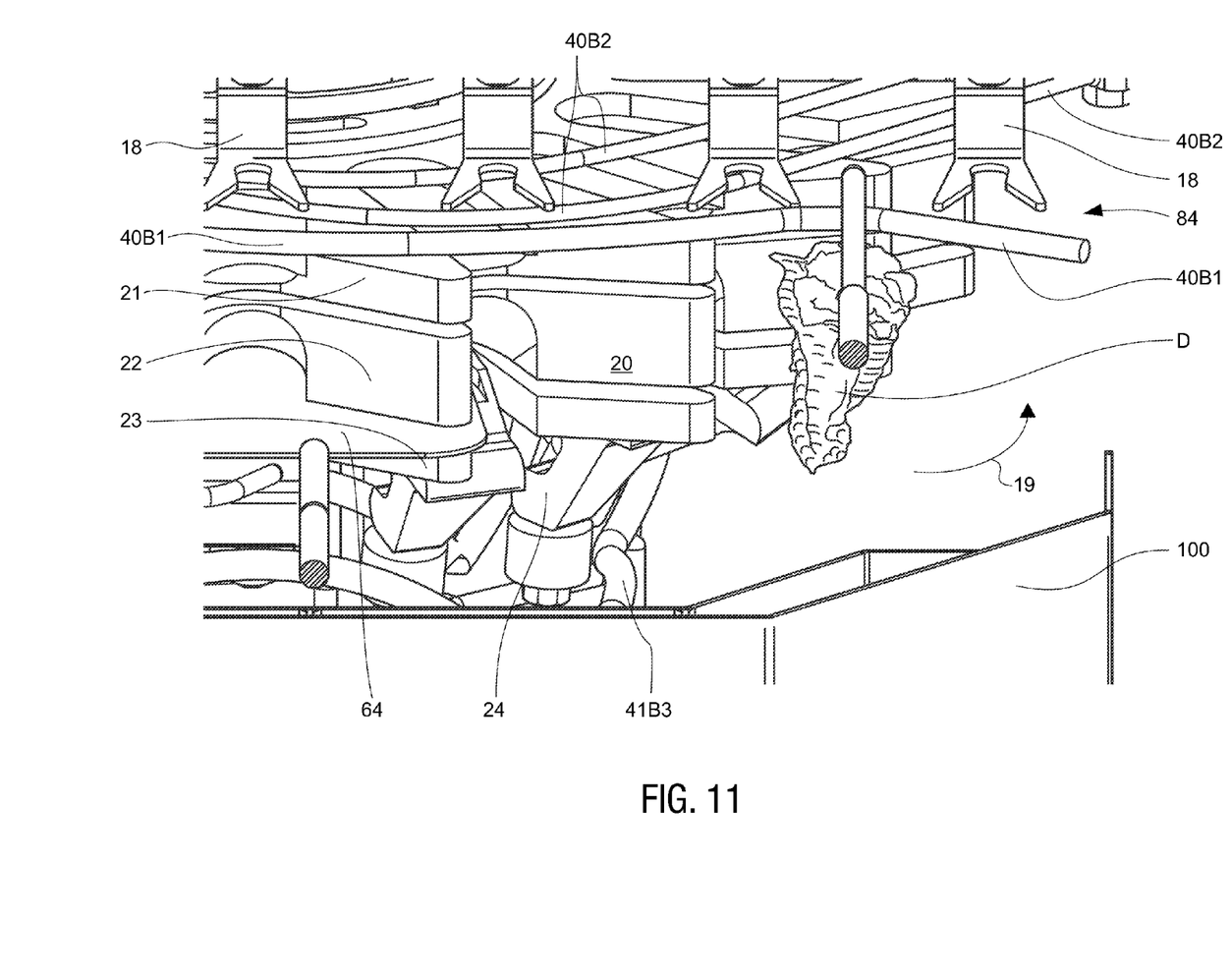
FIG. 11 is a partial cutaway perspective side view of poultry wing segmenter of FIG. 1, showing discharge of drumette from the poultry wing segmenter.

Referring now to FIG. 11 by way of example, and not limitation, there is illustrated a partial cutaway perspective side view of poultry wing segmenter 10 showing discharged of drumette D into a bin, shoot, hopper, or receptacle 100. Preferably, as poultry wings PW traversearound wing wheel 20, as indicated by direction arrows 19, drumette D of poultry wings PW is preferably released from poultry wing segmenter 10 as outside drumette guide bar 40B1 and inside drumette guide bar 40B2 separate from one another as shown by gap 84 to enable wing wheel 20 to discharged drumette D into receptacle 100.

Figure 12:
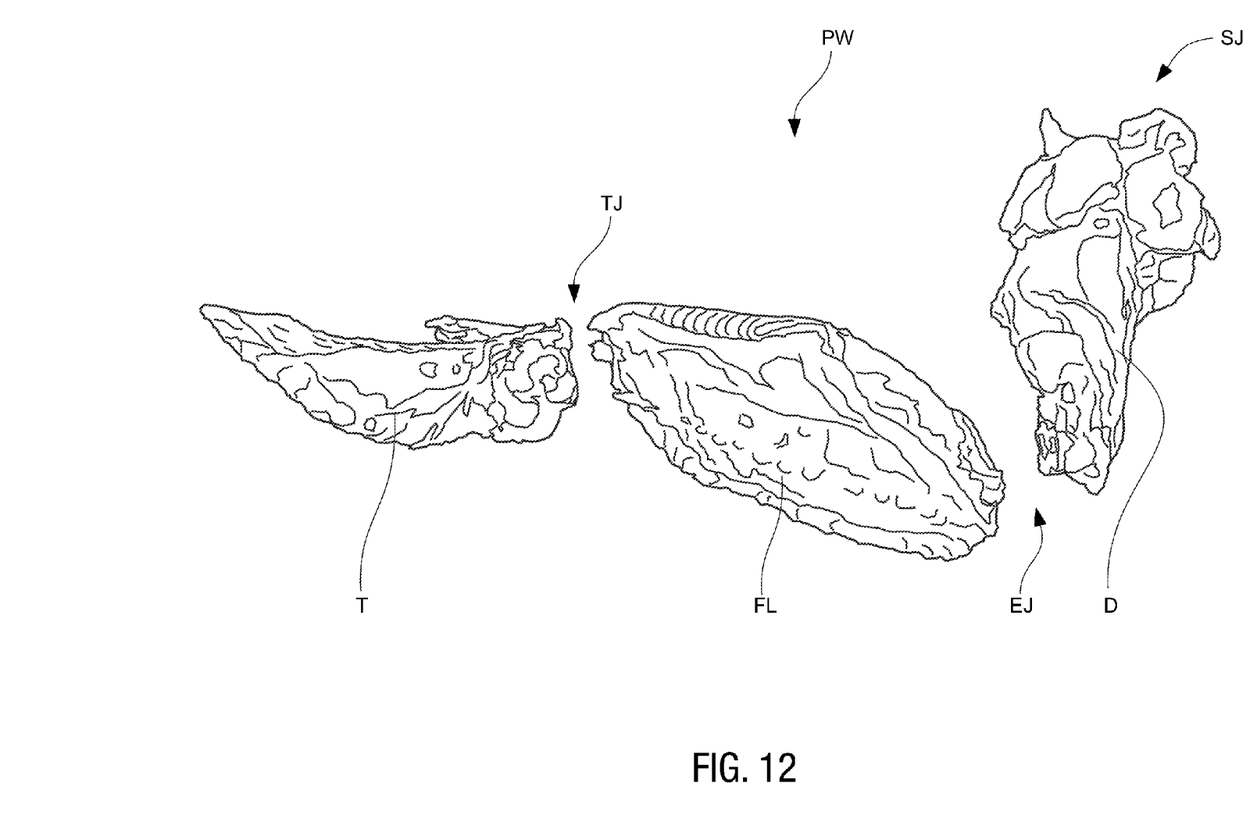
FIG. 12 is a side view of an exemplary poultry wing, shown with segments drumette D, flat FL, and tip T.

Referring now to FIG. 12 by way of example, and not limitation, there is illustrated poultry wings PW. Preferably, poultry wing segmenter 10 segments or portions poultry wings PW by cutting poultry wings PW at the elbow joint EJ between the drumette D and flat FL, and at the tip joint TJ between the flat FL and tip T sections to produce separate poultry wing segments drumette D, flat FL, and tip T.

The foregoing description and drawings comprise illustrative embodiments of the present invention. Having thus described exemplary embodiments, it should be noted by those ordinarily skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains, having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

Therefore, at least the following is claimed:

1. A poultry wing segmenting system to segment the poultry wing into segments, a drumette having a shoulder joint, a flat having an elbow joint and a tip joint, and a tip, said system comprising:
   a drive mechanism;
   a conveyor having a plurality of spaced shackles configured to vertically hold the poultry wing suspended by its shoulder joint;
   a segmented wheel configured with a plurality of contoured troughs circumferentially disposed laterally therearound said segmented wheel, said wheel configured to receive the vertical hung poultry wing from said shackles, and wherein said segmented wheel is configured with one or more annular slots wherein at least one cutting blade is positioned, and wherein said segmented wheel is further configured with a pivotable wing tip cup;
   at least one guide bar disposed adjacent said segmented wheel to bias the at least one segment of the poultry wing against said contoured trough of said segmented wheel and to draw said cutting blade through said annular slots to sever the poultry wing into one or more segments.

2. The poultry wing segmenting system of claim 1, wherein said segmented wheel further comprises a first wheel segment positioned to receive the drumette, a second wheel segment positioned to receive the poultry wing flat, and a third wheel segment positioned to receive the poultry wing tip.

3. The poultry wing segmenting system of claim 2, wherein said pivotable wing tip cup is hinged to said third wheel segment.

4. The poultry wing segmenting system of claim 3, wherein said pivotable wing tip cup further comprises a roller.

5. The poultry wing segmenting system of claim 4, wherein said pivotable wing tip cup is configured to pivot between an open position and a closed position by contact of said roller with a cam.

6. The poultry wing segmenting system of claim 5, wherein said open position is configured to transition the tip and said closed position is configured to hold the tip.

7. The poultry wing segmenting system of claim 5, wherein said closed position is configured to fold the tip.

8. The poultry wing segmenting system of claim 5, wherein wing tip cup further comprises a biased unloader bar configured to discharge the tip.

9. The poultry wing segmenting system of claim 2, wherein said at least one guide bar further comprises at least one drumette guide bar configured to urge the drunmette into one of said plurality of contoured troughs of said first wheel segment.

10. The poultry wing segmenting system of claim 2, wherein said at least one guide bar further comprises at least one tip guide bar configured to urge the flat into one of said plurality of contoured troughs of said second wheel segment.

11. The poultry wing segmenting system of claim 2, wherein said at least one guide bar further comprises at least one tip guide bar configured to urge the tip into one of said plurality of contoured troughs of said third wheel segment.

12. The poultry wing segmenting system of claim 2, wherein said one or more annular slots further comprises a first annular slot positioned between said first wheel segment and said second wheel segment.

13. The poultry wing segmenting system of claim 12, wherein said at least one cutting blade further comprises a first cutting blade positioned therein said first annular slot.

14. The poultry wing segmenting system of claim 2, wherein said one or more annular slots further comprises a second annular slot positioned between said second wheel segment and said third wheel segment.

15. The poultry wing segmenting system of claim 14, wherein said at least one cutting blade further comprises a second cutting blade positioned therein said second annular slot.

16. The poultry wing segmenting system of claim 15, wherein said bifurcated blade further comprises beveled edge configured to separate the wrist joint.

17. The poultry wing segmenting system of claim 15, wherein said second cutting blade further comprises a guide wire configured to guide the wrist joint in to said second cutting blade.

18. The poultry wing segmenting system of claim 14, wherein said second annular slot further comprises a slide plate configured to carry the flat therein said second wheel segment.

19. The poultry wing segmenting system of claim 18, wherein said second cutting blade further comprises a bifurcated blade.

20. The poultry wing segmenting system of claim 1, wherein said shackle traverses an inner path relative to said segmented wheel traverses an outer path, and wherein said at least one guide bar disposed adjacent said segmented wheel transfers the poultry wing from said shackle to one of said plurality of contoured troughs.

* * * * *